April 1, 1930.                    E. B. PAGE                    1,752,926

BRUSH MAKING MACHINE

Filed June 28, 1928

Patented Apr. 1, 1930

1,752,926

UNITED STATES PATENT OFFICE

EDWARD BAILEY PAGE, OF NORWICH, ENGLAND

BRUSH-MAKING MACHINE

Application filed June 28, 1928, Serial No. 288,973, and in Great Britain July 13, 1927.

This invention relates to brush making machines and has reference to bristle filling machines wherein a knot of bristles or equivalent material is forced together with a wire or anchoring device into a previously drilled hole.

Hitherto, in these machines, the separation of a layer of bristles in the storage hoppers has had to be performed from time to time by hand operation and the separated layer moved forward towards the knot picker by a continuously driven chain having tines for engaging the bristles, the knot picker then operating to take the knot of bristles from the feed channel and transfer it to the filling nozzle.

The object of the present invention is to render the whole operation of the bristle feeding and knot picking mechanism entirely automatic and to this end the invention consists broadly of the combination of a hopper for containing the bulk bristle material, automatic means for separating off from time to time a layer of the material at the bottom of the hopper, automatic means for moving the separated layer forward into and through the feed channel, and a knot picker operating to take a knot of bristle material from the feed channel and transfer it to the nozzle of the filling machine.

The particular means I prefer to employ for effecting the feeding movement are a toothed endless chain beneath a horizontal channel containing the bristle material and a toothed rake adapted to have both a vertical movement to carry the tines of the rake into and out of the bristles, and a horizontal movement to carry the bristles forward in the direction of the knot picker this movement setting up a movement of the endless rake chain whose tines are always engaged in the bristle material.

Figure 1:
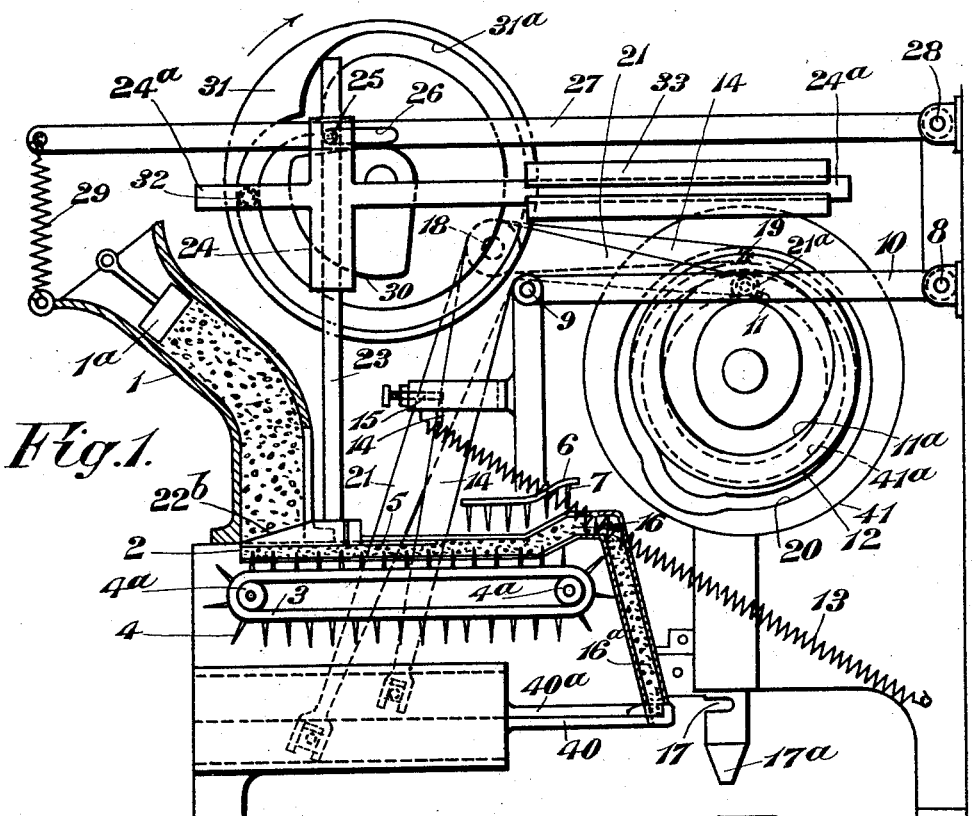
Figure 2:
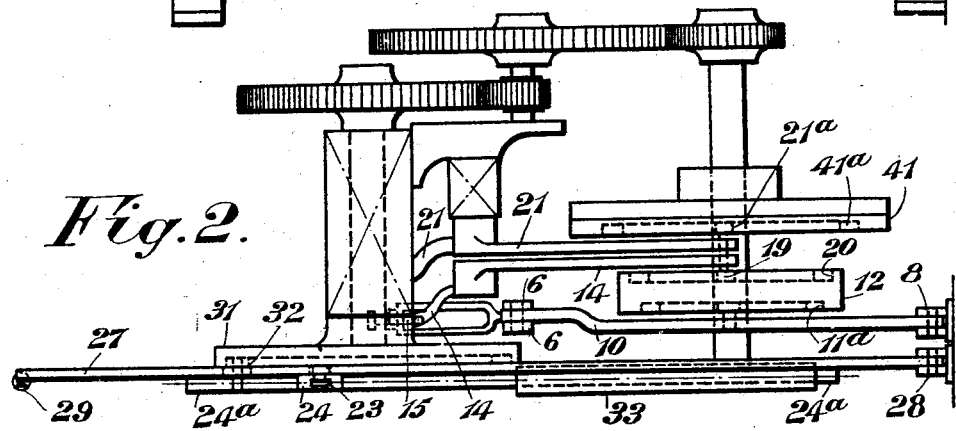
Figure 3:
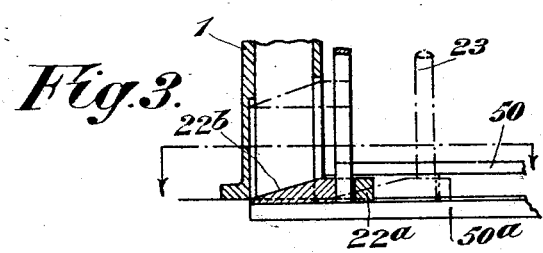
Figure 4:
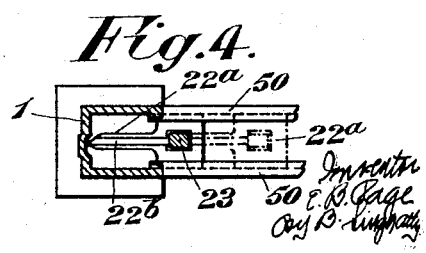

In the accompanying drawings I have illustrated the invention diagrammatically, Fig. 1 being a fragmentary elevational view of the essential elements of the invention, Fig. 2 a plan view thereof, and Figs. 3 and 4 being sectional elevation and plan views of a detail.

Referring to these drawings wherein like numerals of reference indicate corresponding parts wherever occurring, the numeral 1 designates a hopper in which the bristle material is stored, a spring or weight influenced plunger $1^a$ operating to move the bulk of material forward.

The bristles leave the hopper at the bottom 2. A chain rake 3 having teeth or tines 4 is mounted to run idly on the wheels $4^a$. That is to say, it is the movement of the material in the feed channel 5 which moves the chain as will hereafter appear. The feed is effected actually by a rocking rake 6 having teeth or tines 7.

This rocking rake 6 is pivoted at 9 to a link 10 which is pivoted at 8 to a fixed part of the machine. The link 10 carries a roller 11 which coacts with a cam path $11^a$ cut in the cam 12 to effect a lowering and raising movement to carry the tines 7 into and out of the material. The rocking is effected by the direct push of the feeding lever 14, a set screw 15 coacting with the edge of the lever 14 when the lever moves back. The forward or feeding movement of the rake is effected by a spring 13 after the rake has been lowered by the cam roller 11 in the cam path $11^a$ and the edge of the lever 14 is cut as indicated at $14^a$ so as to cause the tines 7 of the rake 6 to drop straight through the material in the horizontal part 5 of the bristle feed channel.

The lever 14 is connected at its free end to the knot picker 40, $40^a$, which takes the tuft of bristles from the bottom $16^a$ of the downturned extension of the feed channel and pushes the tuft into the filling nozzle 17 in the usual way. This device is of well known character and need not be described except to say that the levers 14 and 21 operate to open and close the picker elements 40 and $40^a$ and cause them to then advance to push the tuft into the nozzle 17 after which the retraction of the knot picker occurs, the positioned knot then being forced through the nozzle top $17^a$ into the brush stock in well known manner.

The lever 14 is pivoted at 18 and a roller 19 at its end is operated by a cam path 20.

There is a second lever 21 which operates the second member 40 of the knot picker and this is operated in timed relation by a roller 21$^a$ in a second cam path 41$^a$ in accordance with known practice.

This tuft picking operation forms no part of the present invention and need not therefore be further considered except that it must be remembered that at each operation a tuft is taken by this picker, whatever its form may be, and is delivered to the feeding nozzle 17. It is, however, important from the point of view of the present invention that the forward movement of the picker 40—40$^a$ takes place at the same time as the rocking rake 6 is moving in the same direction so that when the tuft is being "picked" there is packing pressure being applied by the rake to the material in the forward part of the feed channel.

The continuous delivery of the bristle material to the feed channel is important and this necessitates the removal from the bottom of the hopper of a certain quantity of bristles from time to time and this quantity is separated off intermittently as will hereinafter appear and it is important that the quantity separated off should be at least equal to and may be slightly in excess of the quantity being taken by the tuft picker.

The separation off is effected by a partitioning slide or separator.

This separator is made in two parts 22$^a$ and 22$^b$ which operates as follows:—

The member 22$^a$ is provided with a groove which is occupied by the member 22$^b$ when the movement into the hopper takes place as will hereafter appear and when the two members 22$^a$ and 22$^b$ are in this position they are connected and move together and separate a depth of the material in the hopper. The member 22$^b$ then rises and leaves the member 22$^a$ so that the member 22$^a$ forms a continuation of the top of the feed channel while the member 22$^b$ moves up and separates off the bristles still in the hopper.

The movements are effected as follows:—

The member 22$^b$ is carried upon the lower end of a sliding lever 23 which slides vertically in a guide 24 and is caused to move up and down in timed relation by means of a roller 25 engaging in the slot 26 of a lever 27 which is pivoted at one end 28 to a fixed part of the machine and at the other end is anchored by a tension spring 29. The lever is caused to move up and down by the operation of an edge cam 30 carried by the cam 31$^a$ and by the operation of the spring 29.

The cam has cut in its face a cam path 31$^a$ which operates to effect the movement of the separator 22 into and out of the hopper, the guide 24 carrying an arm 24$^a$ which is provided with a roller 32 and the guide 24 as a whole is capable of sliding horizontally in the slide 33.

The operation is as follows:—

Assuming that the two elements 22$^a$ and 22$^b$ are located in their separated positions in the hopper and separated as shown in dotted lines in Fig. 3 the member 22$^b$ drops down under the cam action until it connects or clutches up to the member 22$^a$; the combined elements then move out of the hopper along guides 50 and 50$^a$ owing to the shape of cam 31 and the bristles in the hopper fall to a level with the bottom of the feed channel.

The cam shape now reverses the movement and the two elements 22$^a$ and 22$^b$ which when together are of wedge formation, are pushed through the mass of bristles and divide off a depth or thickness equal to that required for the feed channel.

The member 22$^b$ now rises leaving the member 22$^a$ upon the top of the separated bristles and these separated bristles are drawn into the feed channel gradually as the toothed chain moves under the influence of the rocking rake 6, the movement being transmitted through the material itself. That is is say the rocking rake 6 is always dragging forward or pushing the bristles in the direction of the knot picker and this drives the idle chain 3 and causes the bristle material to be carried along out of the hopper. The action of the separator is repeated so that there is always a stock of bristles in the feed channel.

It will thus be seen that as a knot of bristle material is removed by the knot picker a further supply is pushed forward and the machine can operate continuously without the necessity for the operator to concern himself with the bristle supply except to see that the hopper 1 is charged from time to time.

What I claim and desire to secure by Letters Patent is:—

1. An automatic bristle feeding device for brush making machines, comprising a bristle feed hopper, a downwardly extending feed channel for the bristles, means for feeding the bristles from the hopper to the downwardly extending feed channel, a horizontally moving picker, a vertically reciprocating filling nozzle, and means for reciprocating the same, and means for reciprocating the picker horizontally below the lower end of the downwardly extending feed channel so as to convey a knot of bristles from the picker to the vertically reciprocating filling nozzle.

2. An automatic bristle feeding device for brush making machines, comprising a bristle feed hopper, a downwardly extending feed channel for the bristles, means for feeding the bristles from the hopper to the downwardly extending feed channel, two horizontally moving picker members, means for moving the two horizontal picker members relatively to one another to form a bristle knot carrier, a vertically reciprocating filling nozzle, and means for reciprocating the two horizontal pickers horizontally to form a knot carrier below the lower end of the downwardly extending feed channel and then moving the pickers simultaneously with the contained knot to the vertically reciprocating filling nozzle.

3. An automatic bristle feeding device for brush making machines, comprising a bristle feed hopper, a downwardly extending feed channel for the bristles, means for feeding the bristles from the hopper to the downwardly extending feed channel, two horizontally moving picker members, cam and lever mechanism for reciprocating each picker member, a vertically reciprocating filling nozzle, the cams being designed to move the horizontally moving picker members relatively to one another to form a knot carrier below the lower end of the downwardly extending feed channel and then to move them simultaneously with the contained knot to the vertically reciprocating filling nozzle.

4. An automatic bristle feeding device for brush making machines, comprising a bristle feed hopper, a bristle separator, means for moving the separator horizontally and vertically, a bristle conveyor, bristle knotting and filling mechanism, and means for transferring the bristles from the conveyor to the knotting and filling mechanism, the means for operating the separator operating to move it horizontally into a slot in the feed hopper and then vertically downwards and then horizontally out of the hopper and so allow a measured quantity of bristles to fall on to the conveyor, the means for transferring the bristles to the knotting and filling mechanism being operated in timed relation to the separator.

5. An automatic bristle feeding device for brush making machines, comprising a vertically slotted feed hopper, a two part bristle separator, means for moving the two parts of the separator together and separately, a bristle conveyor, bristle knotting and filling mechanism, and means for transferring the bristles from the conveyor to the knotting and filling mechanism, the two parts of the separator being movable vertically relatively to one another and the means for operating them operating to move them horizontally into the vertical slot in the hopper and then allow one of them to drop to the level of the conveyor and then the other to move into contact with it and both returned to separating position.

In witness whereof I affix my signature.
EDWARD BAILEY PAGE.